W. W. WENTWORTH.
METHOD OF CURING AND PRESERVING SEED CORN.
APPLICATION FILED MAY 5, 1911.
1,037,382.   Patented Sept. 3, 1912.
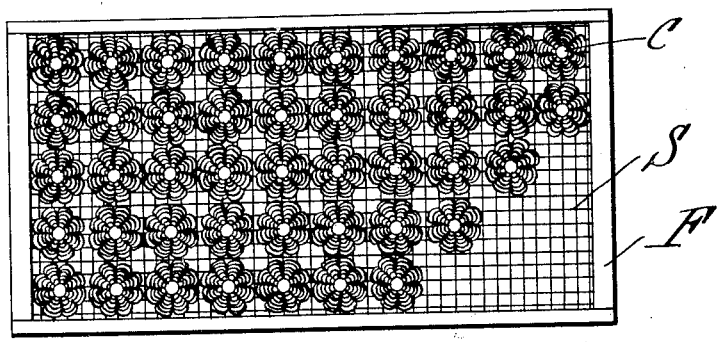
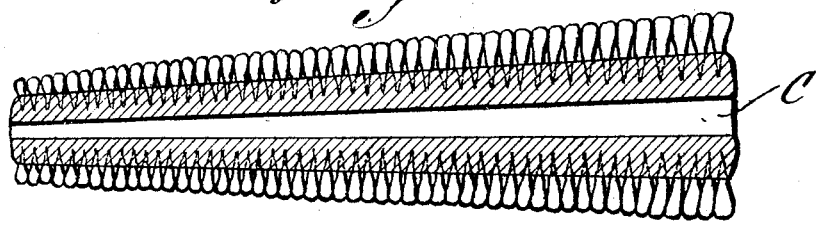
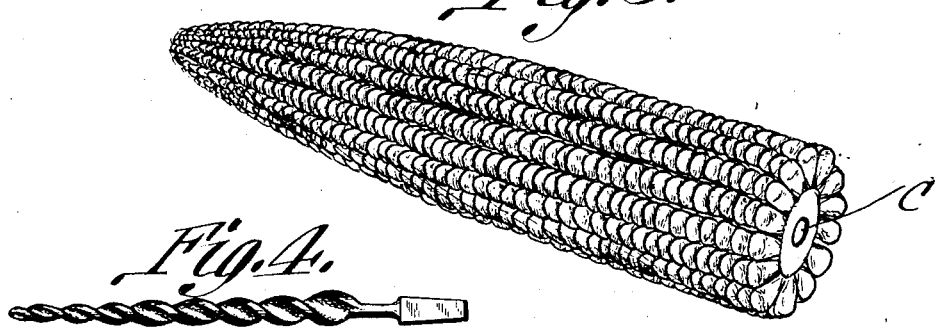
William W. Wentworth, Inventor,
by C. A. Snow & Co., Attorneys.
Witnesses:

UNITED STATES PATENT OFFICE.

WILLIAM W. WENTWORTH, OF PRESTON, IOWA.

METHOD OF CURING AND PRESERVING SEED-CORN.

1,037,382.　　　　　Specification of Letters Patent.　　Patented Sept. 3, 1912.

Application filed May 5, 1911. Serial No. 625,205.

*To all whom it may concern:*

Be it known that I, WILLIAM W. WENTWORTH, a citizen of the United States, residing at Preston, in the county of Jackson and State of Iowa, have invented a new and useful Method of Curing and Preserving Seed-Corn, of which the following is a specification.

This invention relates to a method of curing and preserving seed corn, and has for its primary object to provide a method of curing and preserving seed corn on cobs with approximate uniformity and in a simple and efficient manner.

To this end, the present method of curing and preserving seed corn on cobs, which are of varying sizes, consists in drilling bores of a taper corresponding to the taper of the cobs axially through the cobs from the butt ends inward until the bores increase to a size so as to give a predetermined thickness to the remaining shells of the cobs without injuring or disturbing the chits of the kernels, and then permitting air to circulate through the bores to draw the moisture from the shells and kernels with approximate uniformity.

It it known, that it is old in the art to pass a bore through a cob of corn for the purpose of drawing the moisture from the kernels and remaining shell of the cob, as shown in the patent issued June 30, 1857 to D. Rowe, No. 17,697. The method of preserving the seed corn as described in the said patent, however, is inefficient for the reason that the same does not provide for curing and preserving the seed corn on cobs of varying sizes and with approximate uniformity. This is essential in the curing preservation of seed corn on cobs, and has been attained by the method or process hereinafter described in detail.

It is known, that the cobs of various grades of corn have a taper from the butt ends to the tips thereof, which taper varies with the various grades of corn, and the present method contemplates treating the cobs in such a manner as to uniformly cure and preserve the seed corn of any grade.

In the accompanying drawings, wherein similar reference characters denote corresponding parts:—Figure 1 is a plan view showing the manner in which the ears of corn are finally treated. Fig. 2 is a longitudinal section through an ear of corn treated according to the present method. Fig. 3 is a perspective view of an ear of corn which has been treated according to the present method. Fig. 4 is an elevation of a drill employed in carrying out the present method, which view is on a reduced scale.

In carrying the present method into effect, the ears are selected from a grade of corn, which are to supply seed for the succeeding crop, those ears which are found unfit for supplying seed corn being discarded. The ears are then taken, one by one, and a tapered bore C is drilled through each of the cobs thereof. In order to accomplish this result, a tapered twist drill, as shown in Fig. 4, is employed, this drill having a taper corresponding to the taper of the particular grade of corn being treated and being of a length longer than the largest sizes of ears of the particular grade. This twist drill is revolved upon a lathe or in any other manner, and the ears of corn are then applied thereto, in order to drill the tapered bores axially through the cobs from the butt ends inward. These bores are drilled inwardly through the various cobs until the bores increase to a size so as to give a predetermined thickness to the remaining shells of the cobs without injuring or disturbing the chits of the kernels. This is effected by moving the larger cobs farther upon the twist drill, and it will therefore be seen that by moving the various sizes of cobs to a proper position upon the twist drill, the sizes of the bores may be made to correspond with the sizes of the cobs. It is also understood that straight ears of corn are selected for this purpose, and if desired those ears which are crooked when plucked may be straightened immediately after plucking, which will render them fit for treatment according to the present method. It will also be seen that various tapers of twist drills may be employed for various grades of corn having different tapers. After the ears of corn have thus been treated, the same are set on end within a frame F, having a screened bottom S, which will permit air to circulate through the bores. This circulation of air through the bores will draw the moisture from the shells and kernels with approximate uniformity.

This method is simple and efficient in attaining the result desired, and it has been found in practice that seed corn treated in accordance with the present method provides for a healthy germination of the seed corn resulting in a healthy growth of corn, which is of uniformity and devoid of weak plants and other unhealthy plants.

In the foregoing manner, it will be seen that this method provides for the treatment of various sizes and forms of ears, such as is not provided for in the patent aforesaid, in order to enable the seed corn to be cured and preserved with approximate uniformity. I, therefore, do not broadly claim the method of curing and preserving seed corn on cobs which consists in drilling a bore through the cob thereof, but What I do claim and desire to protect by Letters Patent is:—

The method of uniformly curing and preserving seed corn on cobs of varying sizes, which consists in drilling bores of a taper corresponding to the taper of the cobs axially through the cobs from the butt ends inward until the bores increase to a size so as to give a predetermined thickness to the remaining shells of the cobs without injuring or disturbing the chits of the kernels, and then permitting air to circulate through the bores to draw the moisture from the shells and kernels with approximate uniformity.

In testimony that I claim the foregoing as my own, I have hereto affixed my signature in the presence of two witnesses.

WILLIAM W. WENTWORTH.

Witnesses:
MURRAY EATON,
C. W. MILLER.